US012173549B2

(12) United States Patent
Lizama et al.

(10) Patent No.: US 12,173,549 B2
(45) Date of Patent: Dec. 24, 2024

(54) ADAPTED POWER WINDOW SWITCH ASSEMBLY AND RETROFIT KIT

(71) Applicants: Mauricio A. Lizama, San Juan, PR (US); David Serrano, Mayaguez, PR (US); Santiago Duque, Mayaguez, PR (US)

(72) Inventors: Mauricio A. Lizama, San Juan, PR (US); David Serrano, Mayaguez, PR (US); Santiago Duque, Mayaguez, PR (US)

(73) Assignee: University of Puerto Rico, San Juan, PR (US)

( * ) Notice: Subject to any disclaimer, the term of this patent is extended or adjusted under 35 U.S.C. 154(b) by 0 days.

(21) Appl. No.: 18/345,876

(22) Filed: Jun. 30, 2023

(65) Prior Publication Data

US 2023/0349220 A1 Nov. 2, 2023

Related U.S. Application Data

(63) Continuation of application No. 17/347,581, filed on Jun. 14, 2021, now Pat. No. 12,000,195.

(51) Int. Cl.
*E05F 15/695* (2015.01)
*E05F 15/689* (2015.01)

(52) U.S. Cl.
CPC .......... *E05F 15/695* (2015.01); *E05F 15/689* (2015.01); *E05Y 2400/854* (2013.01);
(Continued)

(58) Field of Classification Search
CPC .................. E05F 15/695; E05F 15/689; E05Y 2400/854; E05Y 2400/86; E05Y 2800/268; E05Y 2800/70; E05Y 2900/55
See application file for complete search history.

(56) References Cited

FOREIGN PATENT DOCUMENTS

| | | | |
|---|---|---|---|
| DE | 102018200216 A1 * | 7/2019 | |
| JP | 4689897 B2 * | 5/2011 | |

OTHER PUBLICATIONS

JP-4689897-B2 (Sakai N) (May 25, 2011) (Machine Translation) (Year: 2011).*

(Continued)

*Primary Examiner* — Mahmoud Gimie
(74) *Attorney, Agent, or Firm* — Patenting Consulting Group; Roberto J Rios

(57) ABSTRACT

A mechanical adaptation to a vehicle power window controls is provided that require less hand/finger coordination and less force to actuate, therefore becoming useful for persons with limited control of their hands (e.g., arthritis, muscular dystrophy, multiple sclerosis, cerebral palsy, and spinal cord injury, among others). A power window control includes four levers, one on each control switch. Two of the levers are long and the other two are shorter. The long levers are provided on the two switches further away from the user (which control the front and rear left side windows). The short levers are attached to the two switches closer to the user (which control the front and rear right side windows). The base of each lever can be attached to the corresponding switch through a heavy-duty double-sided tape, where for flat switches, the lever is attached directly to the switch surface and for contoured switches, an adapter can be provided between the base of the lever and the surface of the power window switch.

19 Claims, 11 Drawing Sheets

(52) U.S. Cl.
CPC ..... *E05Y 2400/86* (2013.01); *E05Y 2800/268* (2013.01); *E05Y 2800/70* (2013.01); *E05Y 2900/55* (2013.01)

(56) References Cited

OTHER PUBLICATIONS

DE-102018200216-A1 (Spahmann A) (Jul. 11, 2019) (Machine Translation) (Year: 2019).*

* cited by examiner

ADAPTED POWER WINDOW SWITCH ASSEMBLY AND RETROFIT KIT

FIELD OF THE INVENTION

The present invention relates to the field of medical devices; and, more particularly, to an adapted vehicle power window control for persons with physical disabilities or persons with limited fine motor control.

BACKGROUND OF THE INVENTION

Power windows are a common feature of most modern vehicles, they add much convenience and comfort to the user when compared to the previous knob-turning mechanisms. However, the most typical vehicle power window control uses low profile switches that require significant hand control and finger dexterity not commonly found in persons with physical disabilities. Existing power window switches require a particular push and pull action in order to make them function properly. However, the required grip, finger position, direction of movement and the amount of force required to actuate them, make it difficult or impossible for many persons with disabilities to use.

Adapted vehicles for persons with disabilities are sold worldwide, they usually include access features (e.g., ramps, power transfer seats), primary driving controls and safety features (e.g., locking mechanisms, straps, seat belts). However, the power window controls are not included since they are considered secondary driving controls. Thus, a "fully" adapted vehicle will usually include the original power window control found in any other vehicle. If a person with disabilities needs to control this feature, an additional high tech/high cost must be custom installed in the adapted vehicle.

For example, there are functional systems available in the prior art that allow a person with disabilities to control a vehicle power windows through an electronic adaptation and a remote control:

1. "Advanced Electronic Vehicle Interface Technology, Secondary Control Options" (Electronic Mobility Control, LLC—Augusta, ME USA)—This system is very expensive and requires major adaptation and installation work to be fitted in a vehicle. It works with many but not all vehicles. The device must be professionally installed and serviced. It is intended for persons with significant disabilities; and
2. "Vehicle and Driving adaptations for Disabled Drivers, Secondary Driving Controls" (DS&P Mobility Electronics—Buckinghamshire, England)—This system is also very expensive and requires major adaptation and installation work to be fitted in a vehicle. It also works with many but not all vehicles. The device must be professionally installed and serviced. It is intended for persons with significant disabilities.

This, what is needed is a low-tech mechanical solution that allows easy-to actuate control of a power window for people with disabilities.

SUMMARY OF THE INVENTION

The present invention converts each switch of a power window assembly into an easy-to actuate vertical lever system.

According to an aspect of the invention, the direction and the nature of the switch movement is changed from the OEM actuation design, requiring less hand/finger coordination and less force to actuate.

According to yet another aspect of the invention, the system allows people with limited control of their hands (e.g., arthritis, muscular dystrophy, multiple sclerosis, cerebral palsy, and spinal cord injury, among others) to easily manipulate and actuate a power window switch.

According to still another aspect of the invention, a lever element is placed directly on top of a power window switch.

According to one aspect of the invention, the lever element can be directly attached to any flat-shaped power window switch.

According to yet another aspect of the invention, an adapter can also be used to allow the lever element to be attached to semi-flat or contoured power window switches commonly found in different vehicles brands and models.

According to still another aspect of the invention, the adapter is positioned at the base of the lever element.

According to one aspect of the invention, an adapted power window control system with contoured base adapters is provided. The invention is a mechanical adaptation to a vehicle power window control.

The present invention has several unique characteristics that are particularly useful for persons with physical disabilities or persons with limited fine motor control:

- Easy do-It-Yourself (DIY) type installation. The adapted power window control does not require complex or professional installation.
- Installation over existing controls. There are no structural modifications required and therefore there is no tampering that may void the vehicle's warranty.
- Universal fit. The lever and adapter system allows installation in flat, semi-flat or contoured power window switches found in most vehicle's brands and models.
- Detachable adapter and lever. The system may be easily uninstalled and even transferred to a different vehicle.
- Lever provides improved mechanical advantage so the person can activate it with minimal movement and effort.
- Levers of different heights facilitate reaching the desired switch without unintended activation of the other switches.
- Lever design blends with original power window control panel.
- Easy to clean lever surfaces for sanitizing and disinfecting.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers, and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Figure 1A:
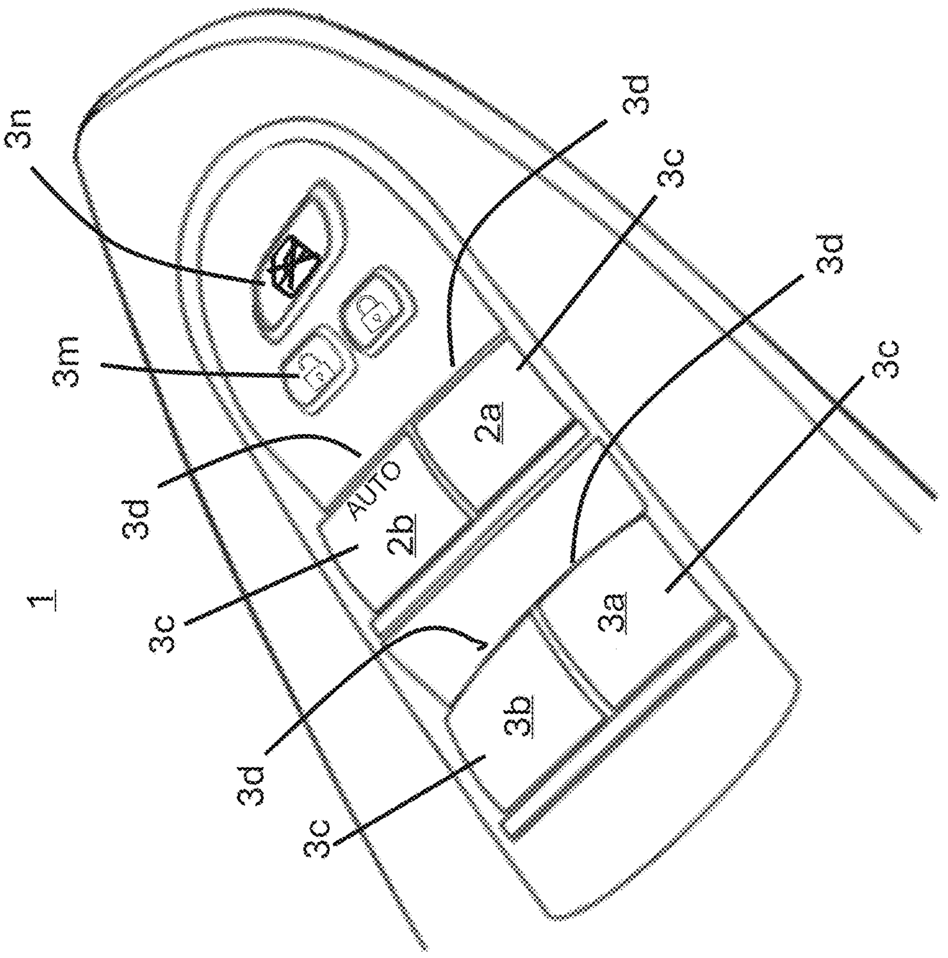
FIG. 1A is a perspective view of a typical vehicle's power window control panel with flat top switches.

One typical power window control unit (1) is fitted with four levers (2*a*, 2*b*, 3*a*, 3*b*), one provided on each window control switch (FIG. 1A). Generally, other controls can also be provided such as but not limited to a door lock/unlock switch lever (3*m*) and a window lock switch lever (3*n*). Levers (2*b*) and (3*b*) control a driver's side front window and rear window, respectively, and levers (2*a*) and (3*a*) control a passenger's side front window and rear window, respectively. As can be appreciated, the levers (2*a*, 2*b*, 3*a*, 3*b*) have a flat upper surface (3*c*) configured to receive a person's finger in order to push down the levers and a pull portion (3*d*) configured to receive a person's finger in order to pull up the levers.

Figure 1B:
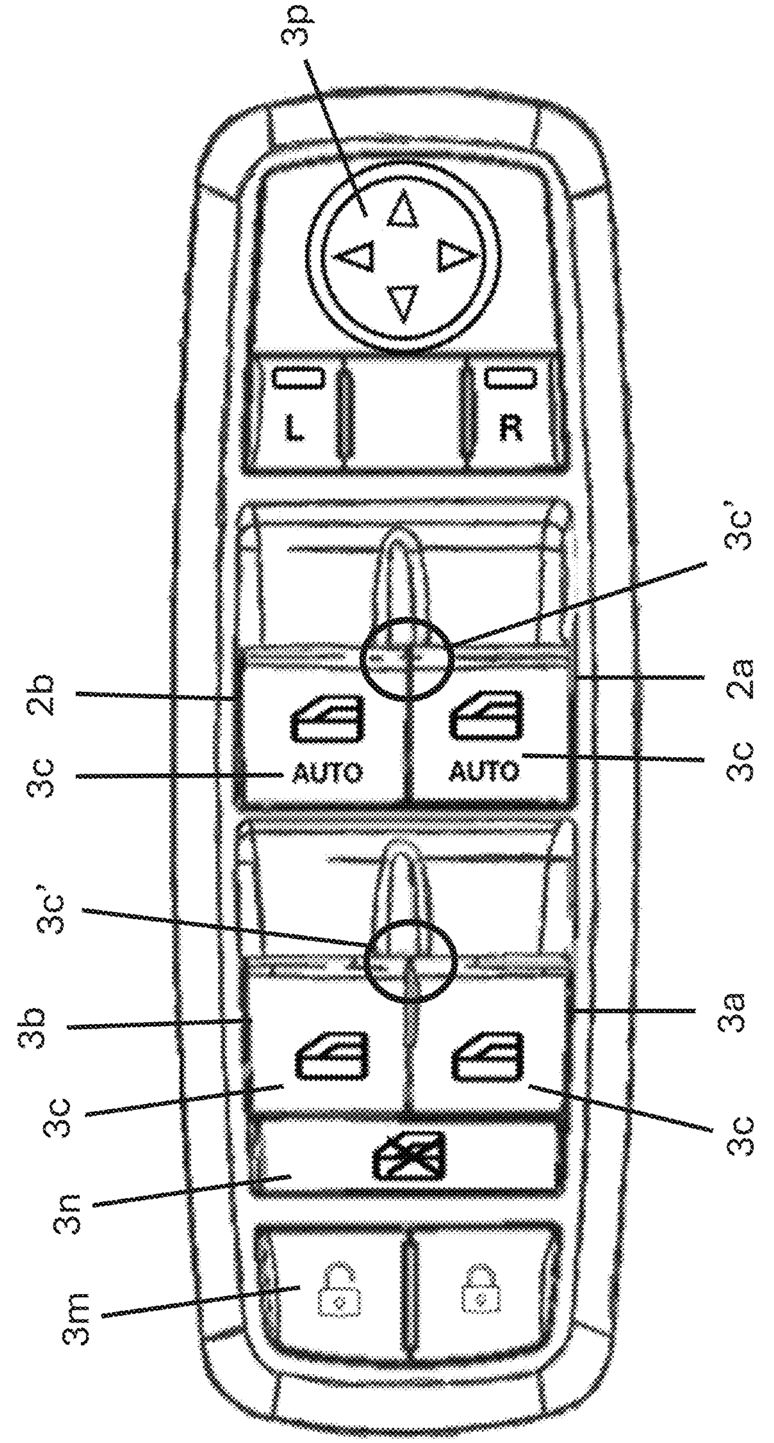
FIG. 1B is a perspective view of another typical vehicle's power window control panel with contoured-top switches.

FIG. 1B shows another typical power window control unit (1) being also fitted with four levers (2*a*, 2*b*, 3*a*, 3*b*), one provided on each window control switch. Other controls can also be provided such as but not limited to a door lock/unlock switch lever (3*m*), a window lock switch lever (3*n*) and rearview mirror controls (3*p*). Just like the power window control unit shown in FIG. 1A, levers (2*b*) and (3*b*) control a driver's side front window and rear window, respectively, and levers (2*a*) and (3*a*) control a passenger's side front window and rear window, respectively. However, the levers (2*a*, 2*b*, 3*a*, 3*b*) have a contoured upper surface (3*c*) configured to receive a person's finger in order to push down the levers and a pull portion (not shown) configured to receive a person's finger in order to pull up the levers. In each power window switch lever, one of the four corners (3*c*') is raised with respect to the other three corners. This differential height forms a rounded-like contour at the top of each switch lever (2*a*, 2*b*, 3*a*, 3*b*).

Figure 2:
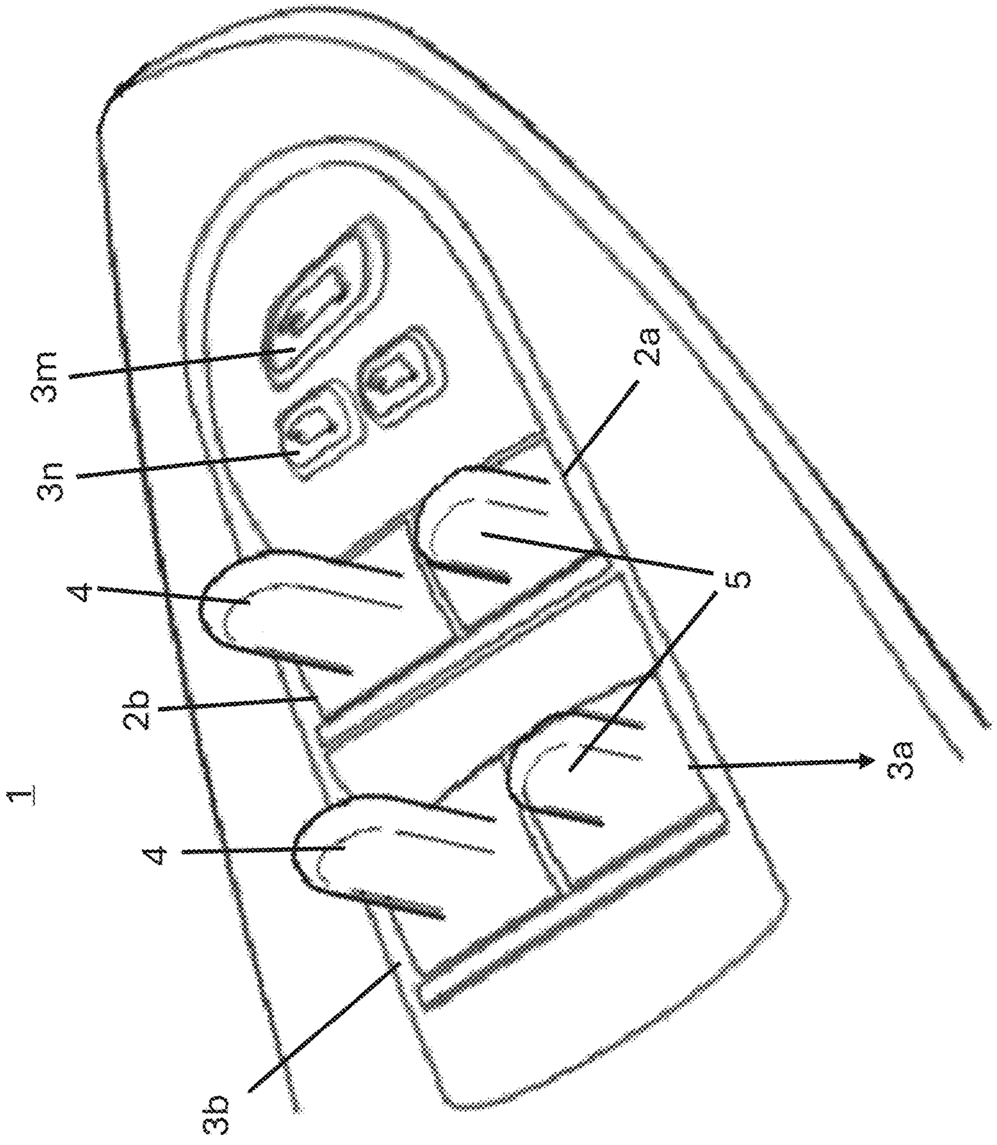
FIG. 2 is a perspective view of the adapted system in accordance with an embodiment of present invention.

FIG. 2 shows a vehicle power window switch assembly (1) including two long levers (4) (for example, approximately 2.5") and two shorter levers (5) (for example, approximately 1.5"). The long levers (4) are attached to the two switches (2*b*, 3*b*) further away from the user (which control the front and rear left side windows). The short levers (5) are attached to the two switches (2*a*, 3*a*) closer to the user (which control the front and rear right side windows). This differential height arrangement is a key aspect of the invention that makes it easier for the user to reach over the first row of levers in order to actuate those levers further away from him/her.

Figure 4:
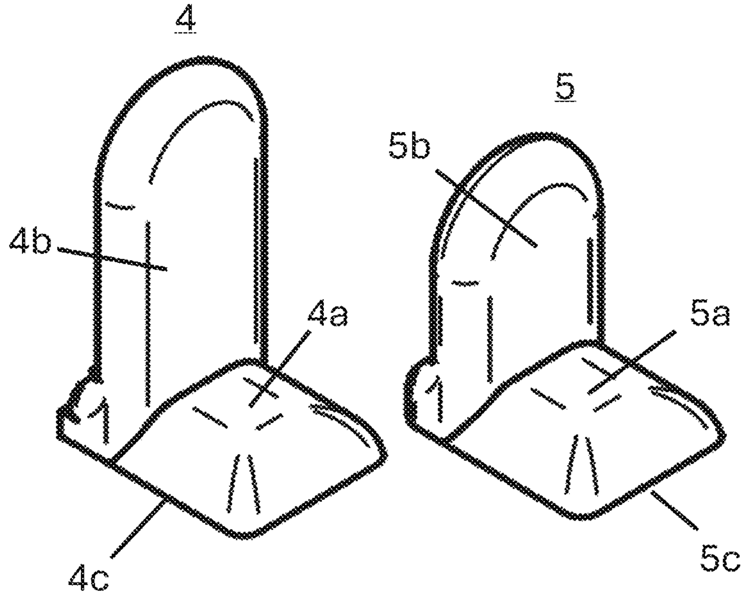
FIG. 4 is a perspective view of the lever arrangement in accordance with an embodiment of the present invention.
Figure 3:
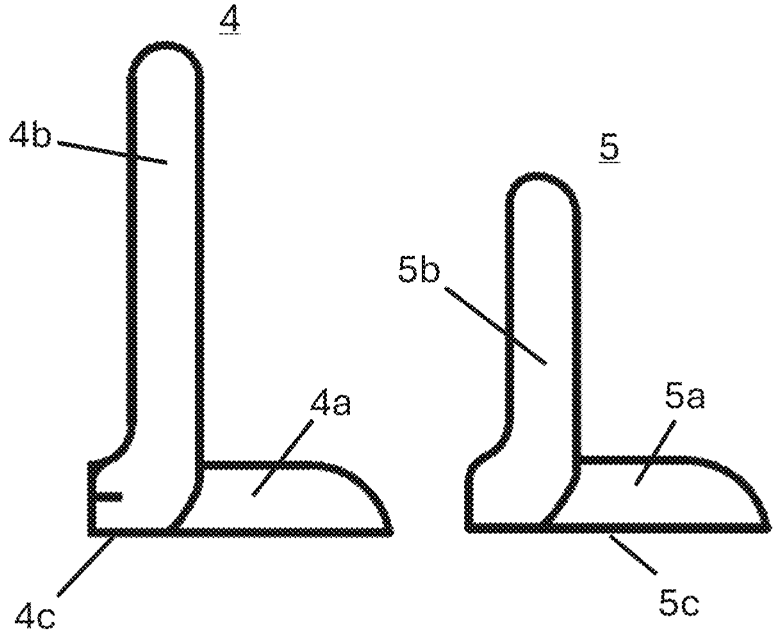
FIG. 3 is a side view of the lever arrangement in accordance with an embodiment of the present invention.
Figure 5:
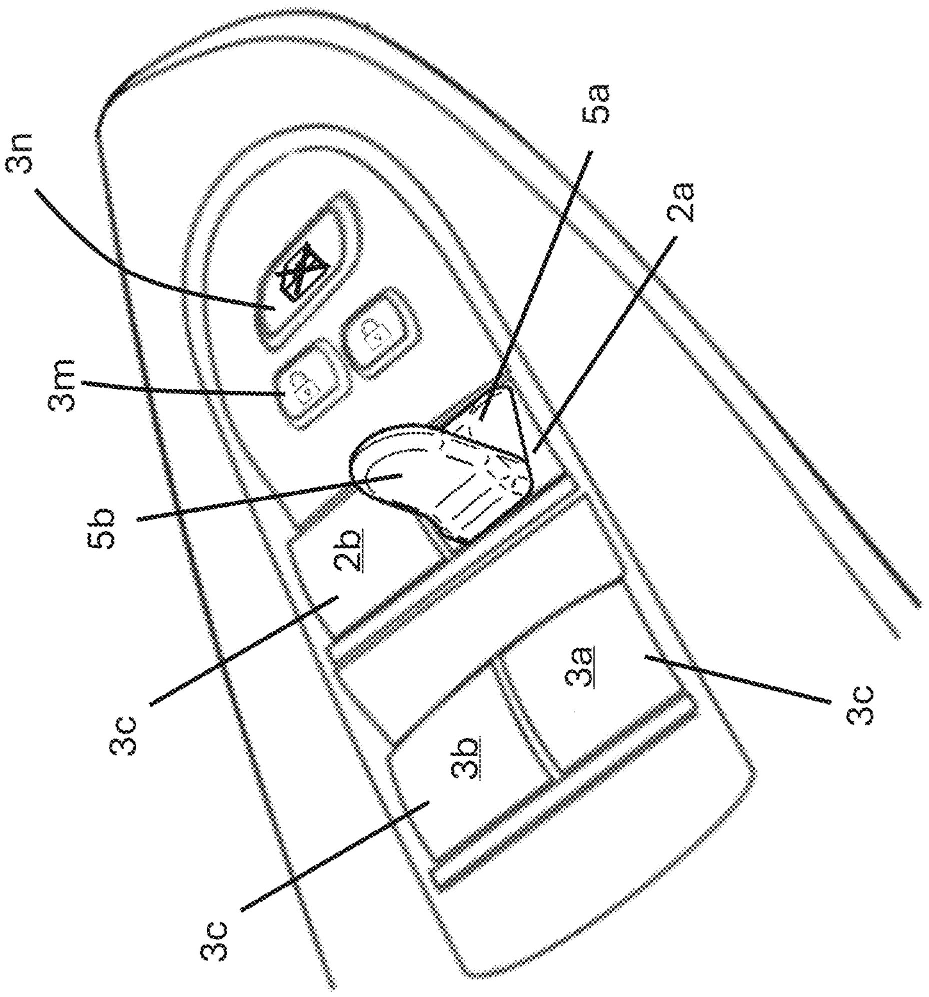
FIG. 5 shows a perspective view of a vehicle's power window control panel including a short lever element with flat base and rounded top in accordance with an embodiment of the present invention.

The lever elements according to an embodiment of the invention, consist of solid extensions with rounded tops and smooth sides to prevent scrapes or cuts (FIGS. 3-5). Long lever (4) has a vertical tab (4*b*) and a horizontal base (4*a*) that has a flat lower surface (4*c*). Short lever (5) has a vertical tab (5*b*) and a horizontal base (5*a*) that has a flat lower surface (5*c*). As exemplified in FIG. 5, a short lever element (5) with horizontal flat base (5*a*) and rounded top (5*b*) is attached to power window switch (2*a*) using an adhesion element (not shown) adhered between the lower surface (5*c*) of the short lever element (5) and the upper surface (3*c*) of the switch (2*a*). In a preferred embodiment, the adhesion element is a heavy-duty double-sided tape.

Figure 6A:
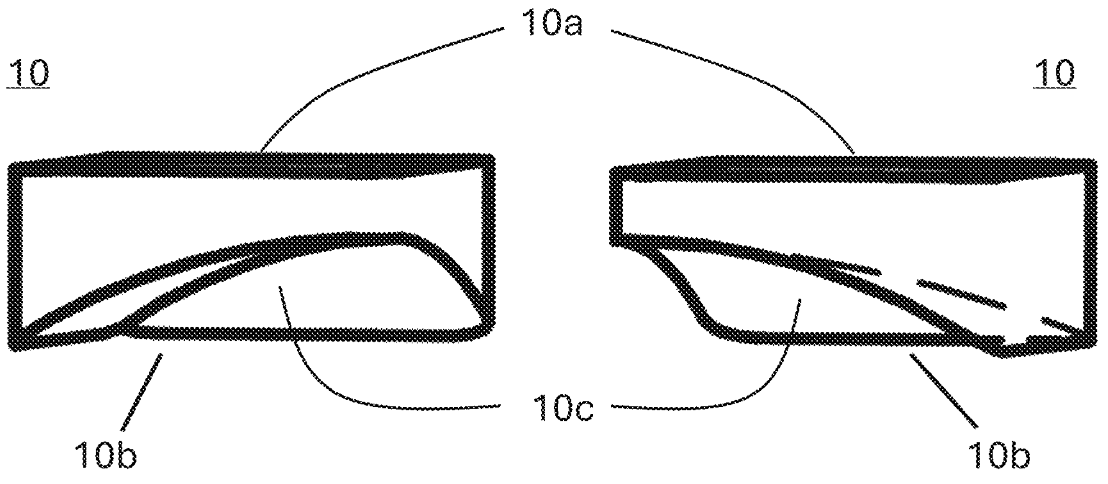
FIG. 6A is a frontal view of the lever adapter in accordance with an embodiment of the present invention.
Figure 6B:
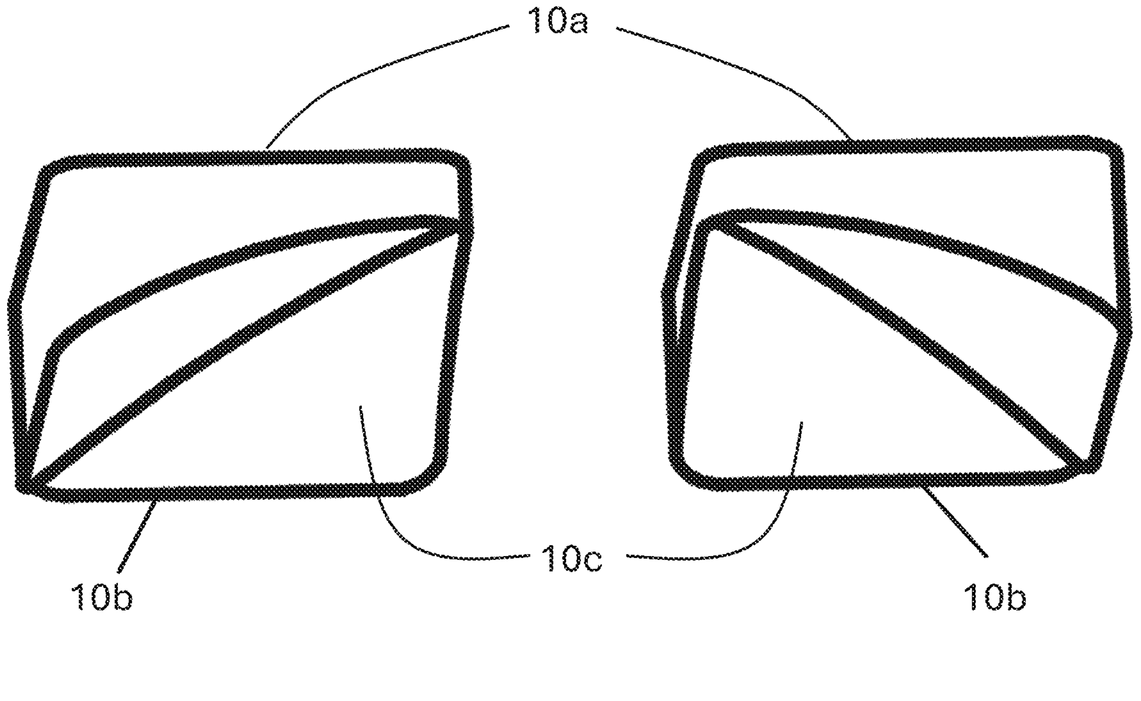
FIG. 6B is a perspective view of the lever adapter in accordance with an embodiment of the present invention.

According to another embodiment of the invention shown in FIGS. 6A and 6B, a lever adapter (10) is provided to attach the lever elements (4, 5) to a switch (2*a*-3*b*) having a contoured upper surface like the ones shown in FIG. 1B. A frontal view (FIG. 6A) and a perspective view (FIG. 6B) of the left and right offset adapters are illustrated. These offset adapters (10) are used to modify the shape of the flat-base lever into a contoured shape in order to fit contoured (non-flat) switch caps. In this example, the adapters (10) fit contoured-top switches that are raised in only one of their four corners and since left and right switches are symmetrical (FIG. 1B), corresponding left and right versions of the adapter (10) are provided. It is to be understood, that the contoured shape (10*c*) is selected to mate the shape of the switch cap so that the lever element is attached to fit the odd-shaped surface. According to a preferred embodiment of the invention, the adapter (10) has a flat upper surface (10*a*) configured to be adhered to a lower surface (4*c*, 5*c*) of the lever elements (4, 5) and a lower surface (10*b*) having a curved contoured shape (10*c*) configured to be adhered to an upper surface (3*c*) of a switch.

Figure 7:
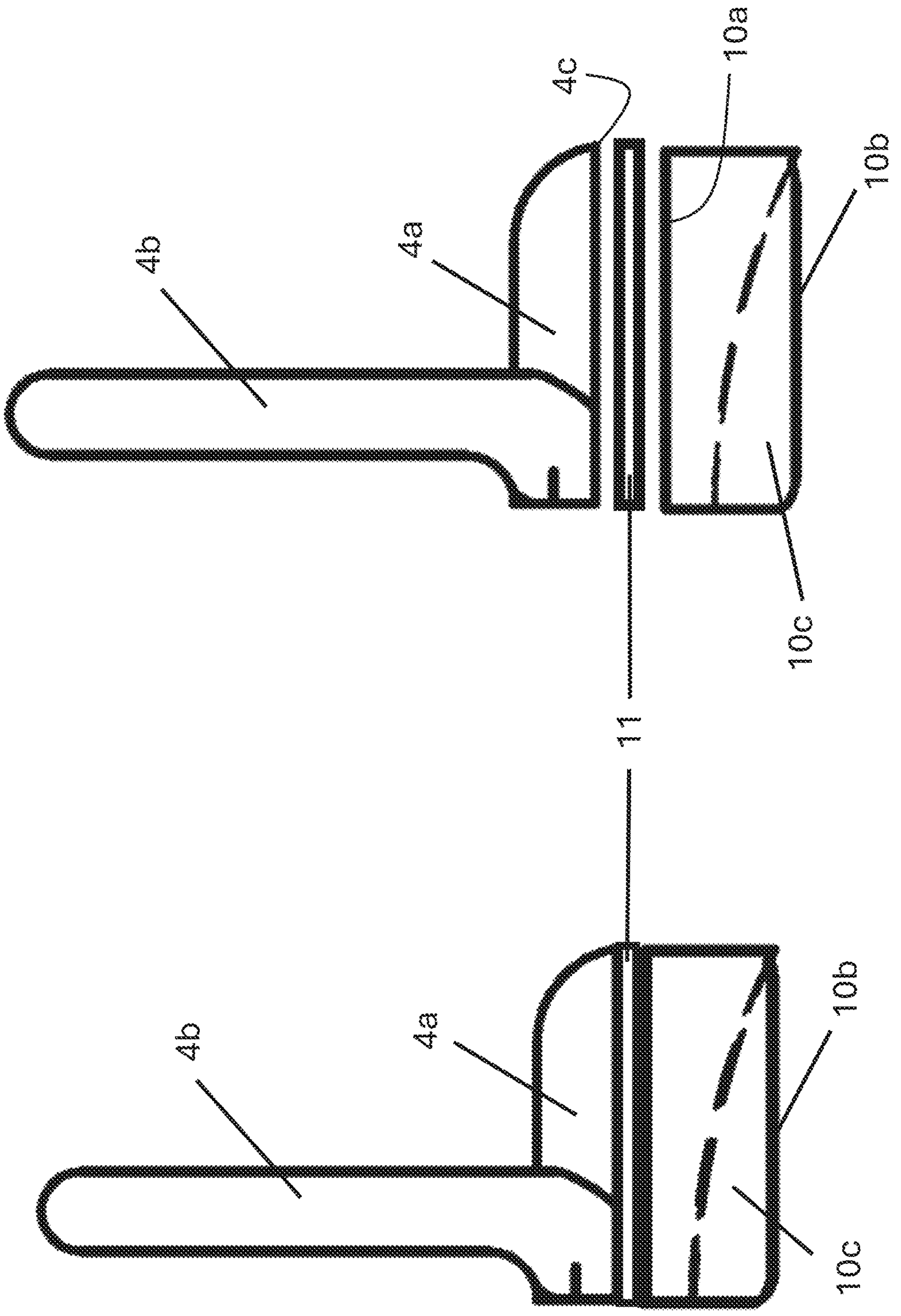
FIG. 7 is a side assembled view (a) and exploded view (b) of the lever arrangement with an adapter in accordance with an embodiment of the present invention.
Figure 8:
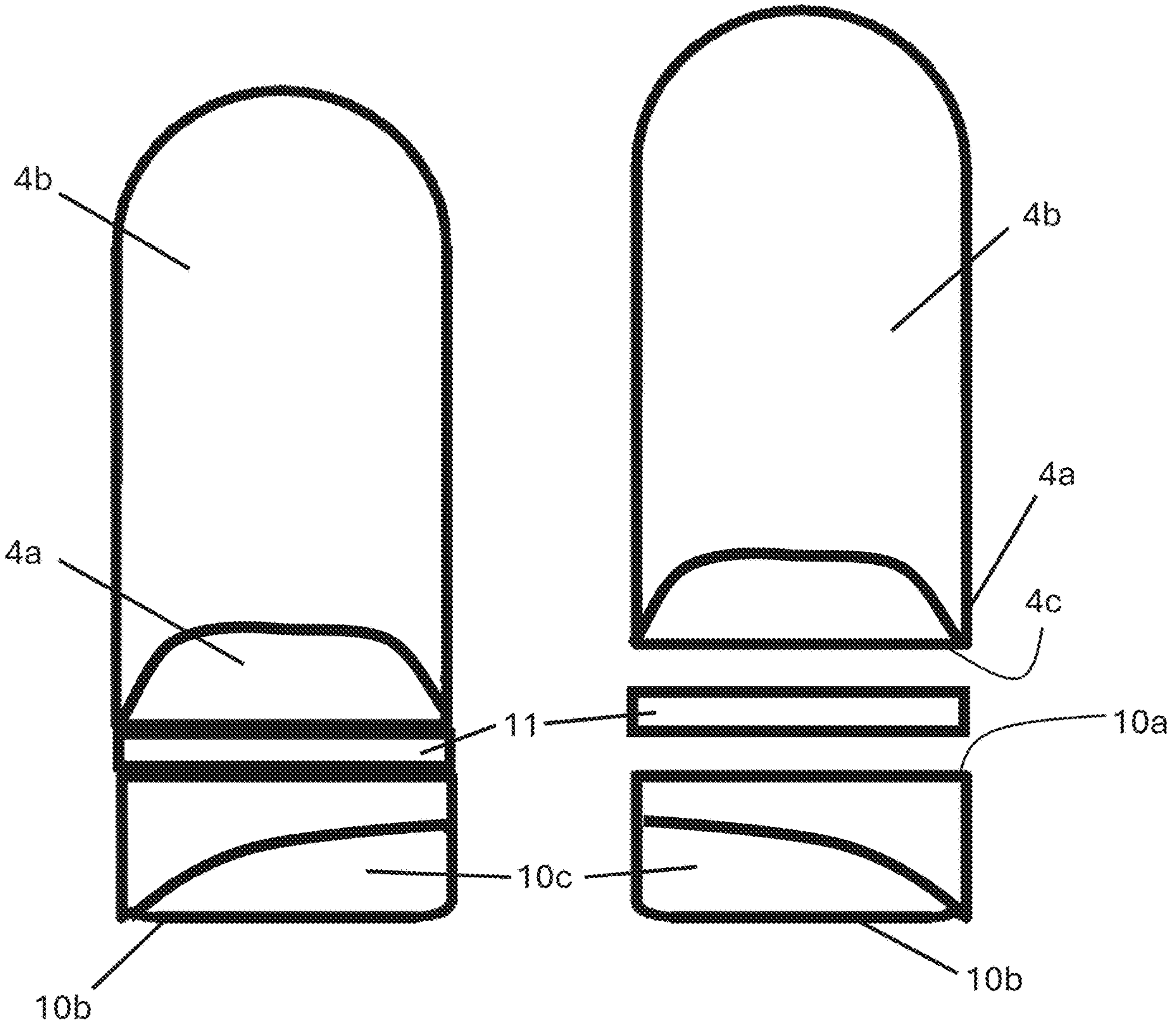
FIG. 8 is a front assembled view (a) and exploded view (b) of the lever arrangement with an adapter in accordance with an embodiment of the present invention.

FIGS. 7 and 8 illustrate how the lever elements are attached to the adapter (10). In a preferred embodiment, a heavy-duty double-sided tape (11) is positioned between a lower surface (4*c*) of the lever (4) and an upper surface (10*a*) of the adapter (10). While lever element is shown in the Figures, it is to be understood the same element and procedures apply to lever element (5).

Figure 9:
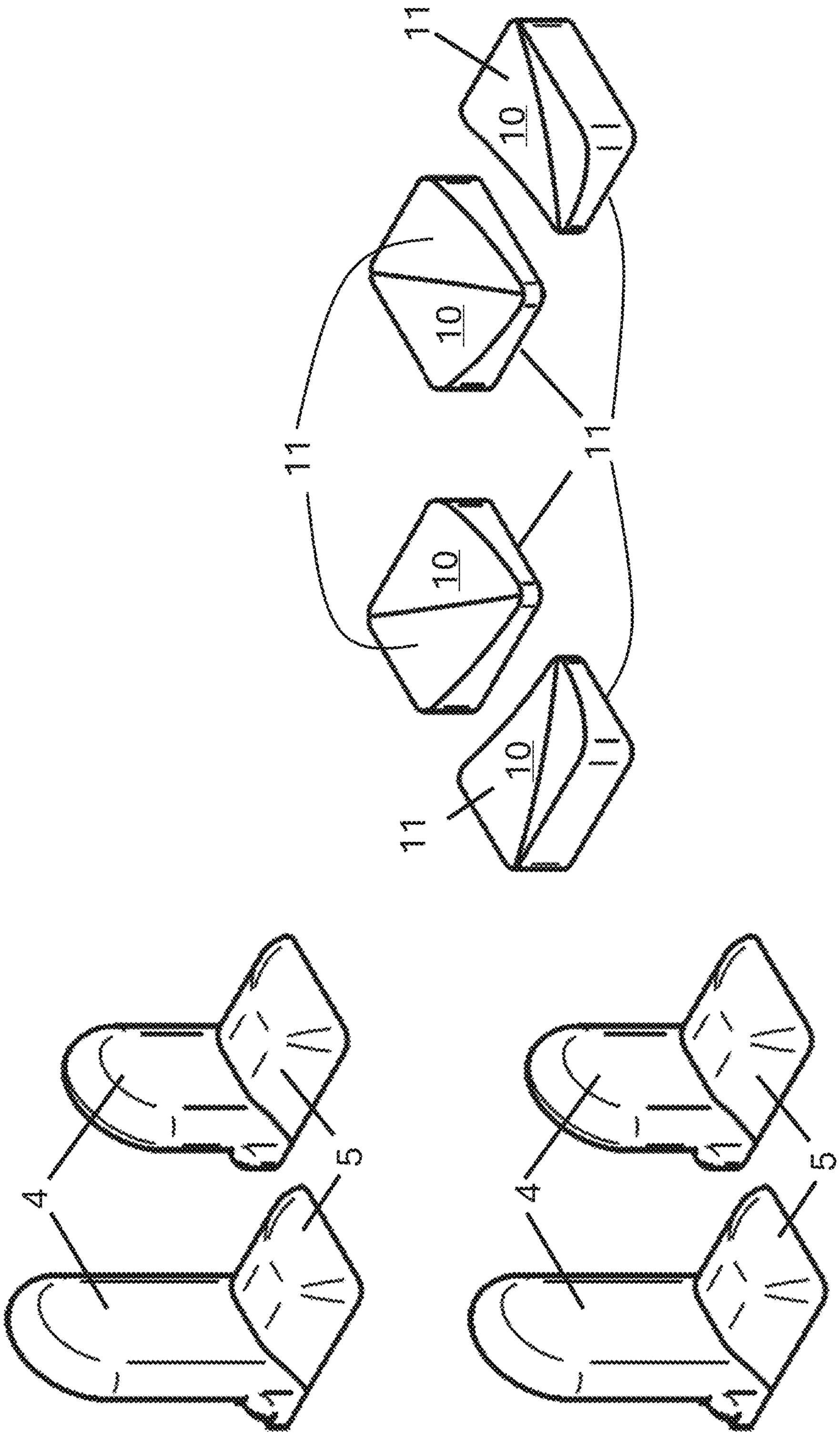
FIG. 9 shows a lever arrangement kit in accordance with an embodiment of the present invention.

According to another embodiment of the invention, the adapted power window switch lever arrangement can be provided as an unassembled retrofit kit (FIG. 9). In an embodiment of the invention, the kit includes long lever elements (4), two short lever elements (5), and contoured adapters (10). Double-sided tape (11) can be provided separately or already adhered to at least one of the upper surfaces (10*a*), the lower surfaces (10*b*) or the lower surfaces (4*c*, 5*c*). According to a preferred embodiment of the invention, a retrofit kit is provided with two long lever elements, two short lever elements, two right-side contoured adapters, two left-side contoured adapters and eight pieces of double-sided tape to attach the parts.

Figure 10:
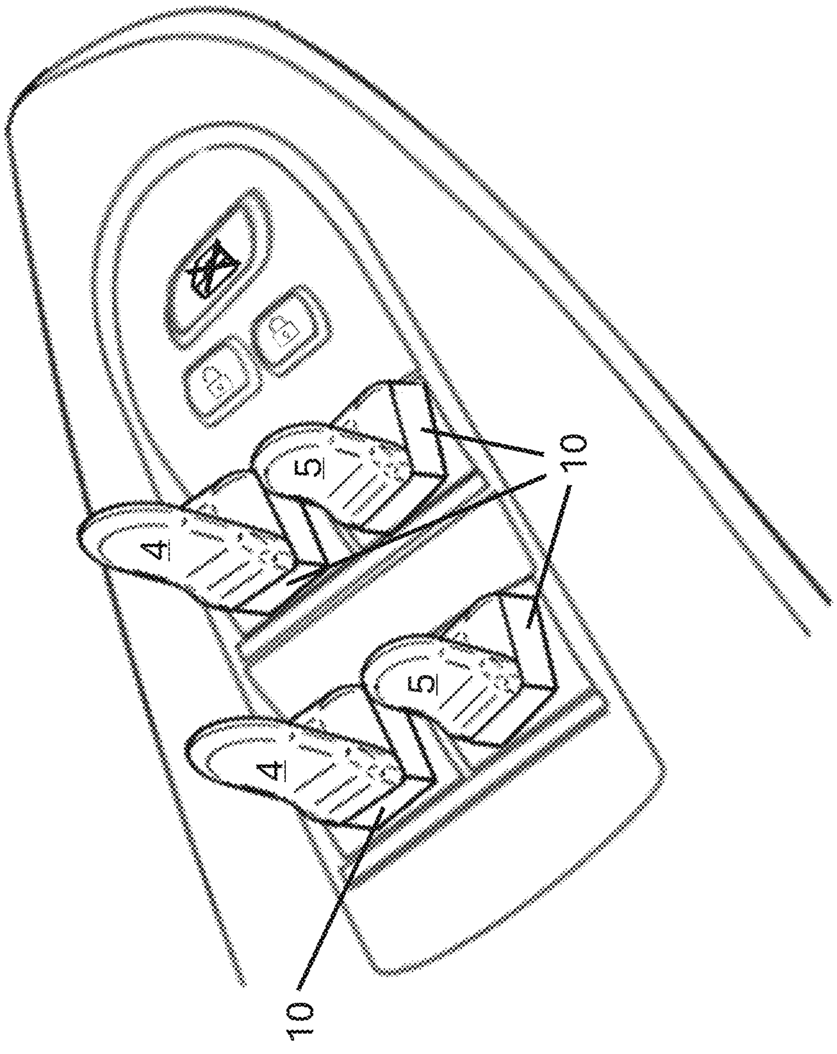
FIG. 10 is a perspective view of the lever arrangement kit assembled to a vehicle power window panel in accordance with an embodiment of the present invention.

As can be appreciated from FIG. 10, the different parts of the retrofit lever kit can be assembled into the switches of a vehicle power window switch assembly. In the example illustrated, two long lever elements (4) and two short lever elements (5) are attached to respective contoured adapters (10) and installed over a vehicle's power window contoured-top switches. Double-sided tape can be used to attach each lever element to the adapter, and each adapter to the switch. The complete adaptation is a semi-permanent functional low-cost solution that blends with the original power window control system.

The invention comprises two main components: lever elements and contoured adapters. In a preferred embodiment, the lever elements have an inverted "L" shape and are constructed of ABS, with a flat base to facilitate attachment, a rounded top, and smooth sides to prevent scrapes or cuts. The flat base measures 18 mm wide by 22 mm long. The short lever elements measure 26 mm high, and the long lever elements measure 36 mm high. All lever elements are 18 mm wide and 5 mm thick throughout their base and vertical tab. The contoured adapters are constructed of ABS and measure 18 mm wide by 22 mm long (same size as the lever base). The top surface of the adapter is flat, but the bottom side is contoured to fit the shape of a non-flat power window switch. Because of this contour, the adapter's total thickness varies from 8 mm to 3 mm at different corners. It is to be understood that these are preferred measurements but that the lever elements and the adapters can have other sizes, measure, shapes, and materials.

In a preferred embodiment, the base of each lever is attached to the corresponding switch using double sided tape such as but not limited to 3M Very High Bond (VHB) tape. For flat switches, the base of the lever is attached directly to the switch surface. For contoured switches found in various vehicle brands and models, an adapter is added between the base of the lever and the surface of the power window switch. In this case, the base of the lever is attached to the flat side of the contoured adapter using double-sided tape and the contoured adapter is then attached to the surface of the power window switch using the same tape.

Lever elements and contoured adapters can be made of plastic, polymer, resin, or metal. They can also be 3D printed using ABS or other material able to withstand high temperatures (e.g., closed car at noon in direct sunlight). The shape and size of the lever elements can vary so that the levers may be longer to reduce the required activation force. In addition, the lever elements may also be shorter to provide enough surface for activation while being small enough not to interfere with the user's movements. The vertical part of the lever element may meet the base of the lever element at the center of the base or at any point towards the back or towards the front of the base. This allows to change the lever element pivot point and to adjust the movement and the force required for switch activation.

Figure 11:
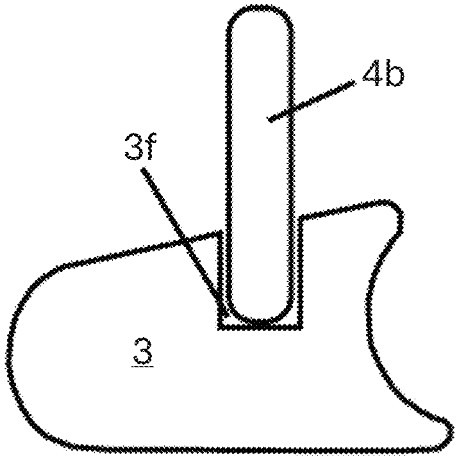
FIG. 11 shows a switch cap having an opening to receive a lever element, according to an embodiment of the invention.
Figure 12:
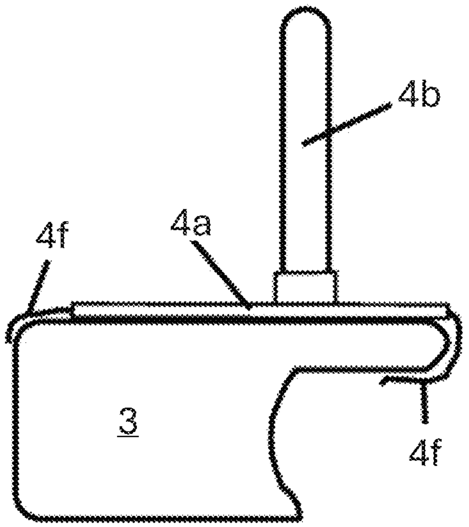
FIG. 12 shows a lever element including a clamp element attached to a switch cap, according to an embodiment of the invention.
Figure 13:
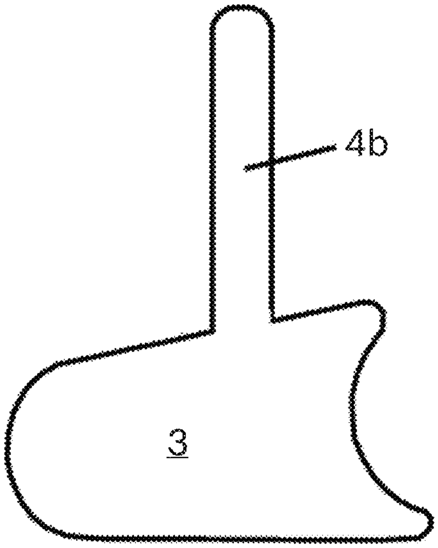
FIG. 13 shows a switch cap with an integral lever element, according to an embodiment of the invention.

In addition, instead of a contoured adapter, a flat base-lever may be attached to a contoured switch using epoxy, resin, or other molding-in-place material. Contours may be directly carved or shaped at the base of each lever so that a contoured adapter is not necessary. The base of the lever may include a "C" shape clamp extension at the front and/or the back to "wrap" the edges of the power window switch (FIG. 12). This "C" shape would fit in the area where a user finger would be placed to pull the switch up (to raise the window). The base with the "C" shape extension clamp would provide a stronger attachment between the lever and the power window switch. Levers may be attached to the contoured adapter and to the power window switch using adhesive or screws. Also, power window switch caps including lever elements can also be provided (FIG. 13). In this case, changing of the original switch caps for the adapted lever switch caps is all that would be required for installation. Levers can be made of different exterior materials and textures, providing a different feel and tactile feedback to the user. Rubberized exterior coating, for example, may be used to improve grip. The vertical component (4*b*, 5*b*) of a lever element (4, 5) may be attached to the corresponding switch through an opening (3*f*) made on the top part of the pushbutton cap (3), as illustrated in FIG. 11. The vertical component of the lever element can then be fitted through the opening and fixed to the pushbutton cap using epoxy or other adhesive. Alternatively, power window switch caps can be manufactured with a pre-installed recessed nut or fitting hole so that the extension levers may be screwed in or pushed in place if needed by the consumer.

The present invention has been illustrated by the description of an exemplary processes and system components and while the various processes and components have been described in considerable detail, it has not been the intention of the presentation in any way as to limit the scope of the invention to such details as to preclude any additional advantages and modifications which may also readily appear to those ordinarily skilled in the art. The invention in its broadest aspects is therefore not limited to the specific details, implementations, or illustrative examples shown and described. Accordingly, departures may be made from such details without departing from the spirit or scope of applicant's general inventive concept.

The invention claimed is:

1. A switch lever system for a vehicle power window switch assembly, said switch lever system comprising:

a first lever element having a first vertical tab configured to control a driver's side window of a vehicle; and a second lever element having a second vertical tab configured to control a passenger's side window of a vehicle, wherein said first lever element and said second lever element are positioned side-by-side on a power window switch assembly of said vehicle and a height of said first vertical tab is greater than a height of said second vertical tab.

2. The lever system of claim 1, wherein said first lever element and said second lever element have a flat lower surface.

3. The lever system of claim 1, wherein said first lever element and said second lever element have a contoured lower surface.

4. The lever system of claim 1, wherein said first lever element and said second lever element comprise a window switch cap of a vehicle power window switch assembly.

5. The lever system of claim 4, wherein said first vertical tab and said second vertical tab are removably attached to said window switch caps.

6. The lever system of claim 5, wherein said first vertical tab and said second vertical tab are inserted into a cavity on said window switch caps.

7. The lever system of claim 1, further comprising adhesion elements configured to be attached to a lower surface of said first and second lever element.

8. A vehicle power window switch assembly comprising:

a first window switch including a first lever element with a first vertical tab configured to control a driver's side window of a vehicle; and a second window switch including a second lever element with a second vertical tab configured to control a passenger's side window of a vehicle, said second vertical tab having a height smaller than a height of said first vertical tab, wherein said first window switch and said second window switch are provided side-by-side on a power window switch assembly so that said first window switch is positioned on a side of said second window switch closer to a vehicle door panel.

9. The vehicle power window switch unit of claim 8, wherein said first lever element and said second lever element are removably attached to a cap of said first window switch and a cap of said second window switch, respectively.

10. The vehicle power window switch unit of claim 8, wherein said first lever element comprises a base having a flat lower surface configured to be removably attached to a flat upper surface of a cap of said first window switch and said second lever element comprises a base having a flat lower surface configured to be removably attached to a flat upper surface of a cap of said second window switch.

11. The vehicle power window switch unit of claim 8, wherein said first lever element and said second lever element comprise a window switch cap of said vehicle power window switch assembly.

12. The vehicle power window switch unit of claim 11, wherein said first vertical tab and said second vertical tab are removably attached to said window switch caps.

13. The vehicle power window switch unit of claim 11, wherein said first vertical tab and said second vertical tab are inserted into a cavity on said window switch caps.

14. A retrofit kit for adapting a vehicle power window switch assembly, said kit comprising:

a pair of first lever elements, each having a first horizontal base and a first vertical tab longitudinally extending perpendicular to said first horizontal base;

a pair of second lever elements, each having a second horizontal base and a second vertical tab longitudinally extending perpendicular to said first horizontal base, wherein a height of said first vertical tab is greater than a height of said second vertical tab; and at least one adhesion element.

15. The retrofit kit of claim 14, wherein said first horizontal base and said second horizontal base have a flat lower surface including said at least one adhesion element.

16. The retrofit kit of claim 14, wherein said first horizontal base and said second horizontal base have a contoured lower surface including said at least one adhesion element.

17. The retrofit kit of claim 14, wherein said pair of first lever elements and said pair of second lever elements comprise window switch caps of a vehicle power window switch assembly.

18. The retrofit kit of claim 17, wherein said first vertical tabs and said second vertical tabs are removably attached to said window switch caps.

19. The retrofit kit of claim 18, wherein said first vertical tab and said second vertical tab are inserted into a cavity on said window switch caps.

* * * * *